W. BUTTLER.
APPARATUS FOR FORMING SHAPES OF GLASSWARE.
APPLICATION FILED JAN. 21, 1911.

996,398.  Patented June 27, 1911.

WITNESSES.  INVENTOR.

UNITED STATES PATENT OFFICE.

WILLIAM BUTTLER, OF INDIANAPOLIS, INDIANA.

APPARATUS FOR FORMING SHAPES OF GLASSWARE.

996,398.　　　　　　　Specification of Letters Patent.　　Patented June 27, 1911.

Application filed January 21, 1911. Serial No. 603,958.

*To all whom it may concern:*

Be it known that I, WILLIAM BUTTLER, a citizen of the United States of America, residing at Indianapolis, in the county of Marion and State of Indiana, have invented a new and useful Improvement in Apparatus for Forming Shapes of Glassware, of which the following is a full, clear, and exact description.

My invention relates to an apparatus for cutting shapes from sheet glass; more particularly circular shapes for table tops, weighing scales, etc.

The invention contemplates the provision of means for cutting the glass shape from a sheet of glass after the said shape has been partially formed by the method described in a companion application of mine of even date herewith, Serial No. 603,959, and which consists in first forming a sheet of glass and producing indentations or cuts in the sheet of glass so formed while the glass is in a plastic condition.

I will now describe my invention so that others skilled in the art to which it appertains may understand and construct the same.

Figure 1:
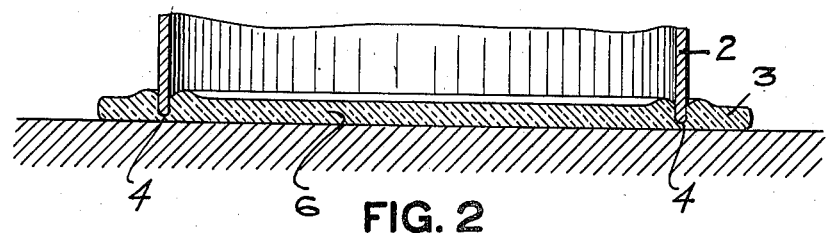
Figure 2:
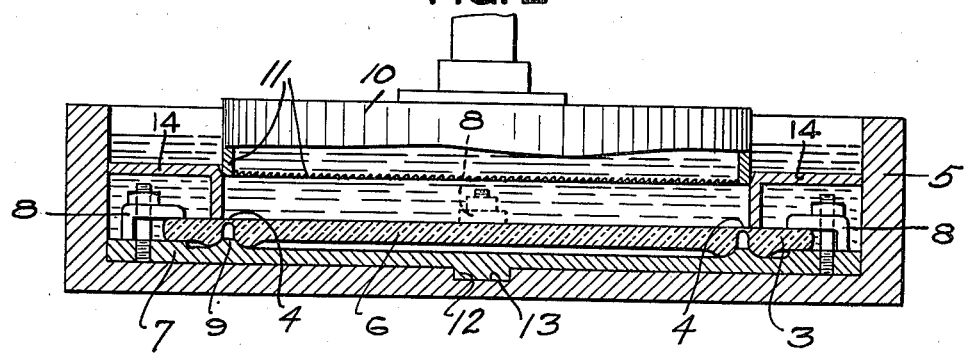
Figure 3:
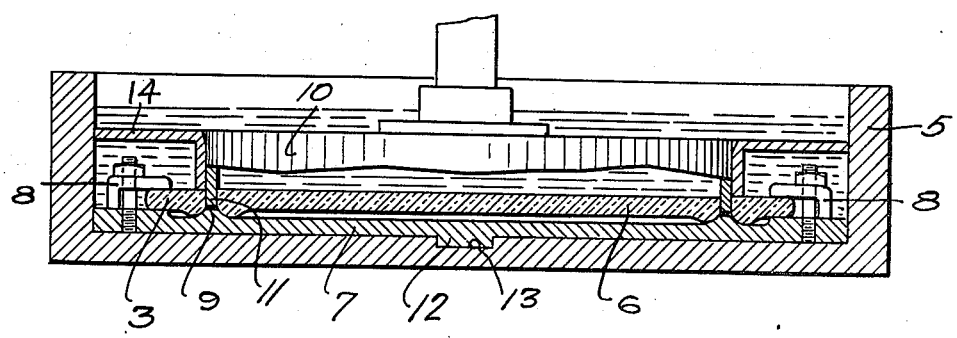

In the drawings, Figure 1 is a vertical sectional view showing the glass shape as being partially formed in a plastic sheet of glass in accordance with my improved method as mentioned above; Fig. 2 is a similar view of my improved apparatus for cutting the shape from the sheet; and Fig. 3 is a similar view, showing the rotatory cutter as having severed the shape from the sheet of glass.

The sheet of glass from which the article is to be formed and then severed from the sheet by my improved apparatus, may be formed in any of the usual methods of manufacturing sheet or plate glass. After the sheet has been formed and while it is still hot and plastic the desired shape is stamped or pressed upon the sheet of glass by means of the suitable cylindrical die 2, the sheet of glass being indicated by the reference numeral 3, in accordance with the method set forth in my above mentioned copending application, Serial Number 603,959.

As stated in my above-mentioned copending application the displacement of the glass in the formation of the outline of the shape is only partially through the sheet, leaving the film-like connecting portion 4, in the accompanying drawings, between the shape and the body portion of the sheet. And it is the cutting away or grinding away of this film-like portion 4 for which my present invention is provided.

The numeral 5 indicates a suitable receptacle which receives the sheet 3 of glass having stamped or partially formed thereon from one side thereof the shape 6. This receptacle 5 has the base plate or bed 7 carrying the clamps 8 by means of which the glass sheet is clamped thereupon and, if desired, the suitable centering ring 9 the purpose of which is to bring the sheet in such position under the circular rotatory cutting tool 10 as to cause the outline of the circular shape displaced on the opposite side of the sheet to lie in registry with the circular cutting face 11 of the said tool 10.

The bed 7 may have the depending boss 12 which enters the recess 13 formed in the bottom of the receptacle 5. Both boss 12 and recess 13 are formed concentric with the ridge or ring 9 thereby enabling base plates 7 carrying rings 9 of various diameters, to be placed concentric with a superposed cutting tool 10. Of course other means may be employed to bring the shape in registry with the cutting tool, and such modification would not depart from my invention.

The tool or cutter 10 is preferably in the form of a lead, *i. e.*, the tool 10 is of such a nature as to draw cutting material from the receptacle 5, such as from a solution of emery and water or sand and water. For this purpose the contacting edge or "cutting" face of the tool, may be seriated so as to facilitate feeding of the cutting material to the glass sheet, or it may take any other suitable form as will operate to effectually set up such feeding.

To prevent slight shifting as displacement of the rotating cutting tool 10, I provide the circular guiding spider 14 which is mounted within the receptacle 5 and which encompasses the tool, as shown, the said spider resting on the glass during the cutting operation.

It will be apparent that the rotatory tool 10 may be connected to any suitable source of power and that various changes may be made in the mechanism shown without departing from my invention.

The advantage of my invention will be appreciated by those skilled in the art since it enables glass shapes to be cut from the sheet, without splintering and breakage.

What I claim and desire to secure by Letters Patent is:

1. An apparatus for cutting glass shapes from sheet glass, comprising a receptacle containing cutting material, means for clamping the sheet within the receptacle, and a superposed cutting tool having an operative face conforming to the outline of the desired shape and adapted to feed the cutting material to the sheet.

2. An apparatus for cutting glass shapes from sheet glass, comprising a receptacle for the sheet, containing cutting material, a superposed driven cutting tool having an operative face conforming to the outline of the shape to be cut, and guiding means for the cutting tool.

3. An apparatus for severing from sheet glass shapes partially formed therein, comprising a driven cutting tool having an operative face conforming to the outline of the shape to be cut, a receptacle for the sheet glass, containing cutting material, a removably mounted plate carried by the receptacle, and means for positioning the sheet on the plate so as to bring the outline of the shape in registry with the operative face of the cutting tool.

In testimony whereof, I have hereunto set my hand.

WILLIAM BUTTLER.

Witnesses:
  CHAS. HALL,
  WALTER STEWART.